(12) United States Patent
Sambhandam Palani et al.

(10) Patent No.: US 7,950,937 B2
(45) Date of Patent: May 31, 2011

(54) CARD CONNECTOR WITH BULGE PORTION

(75) Inventors: Shantha Kumar Sambhandam Palani, Singapore (SG); Nagesh Kestur Nagarajan, Singapore (SG)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 12/580,756

(22) Filed: Oct. 16, 2009

(65) Prior Publication Data

US 2010/0099284 A1    Apr. 22, 2010

(30) Foreign Application Priority Data

Oct. 16, 2008    (SG) .............................. 200807744-8

(51) Int. Cl.
*H01R 13/62* (2006.01)
(52) U.S. Cl. .......................... 439/159; 439/160; 439/946
(58) Field of Classification Search .................. 439/159, 439/160, 377, 946
See application file for complete search history.

(56) References Cited

U.S. PATENT DOCUMENTS

| | | | | |
|---|---|---|---|---|
| 6,068,516 A * | 5/2000 | Chang | ............................ | 439/633 |
| 6,071,134 A * | 6/2000 | Tung | .............................. | 439/159 |
| 6,234,813 B1 * | 5/2001 | Hanyu | ........................... | 439/159 |
| 6,340,305 B1 * | 1/2002 | Liu | ................................ | 439/159 |
| 6,413,106 B1 * | 7/2002 | Yu | ................................. | 439/159 |
| 6,796,816 B2 * | 9/2004 | He | ................................. | 439/159 |
| 6,951,471 B1 * | 10/2005 | Chen | ............................. | 439/159 |
| 7,438,590 B1 * | 10/2008 | Liang et al. | .................... | 439/495 |
| 7,484,977 B2 * | 2/2009 | Hsiao | ............................ | 439/160 |
| 7,611,385 B1 * | 11/2009 | Gao et al. | ...................... | 439/630 |

* cited by examiner

*Primary Examiner* — Hae Moon Hyeon
(74) *Attorney, Agent, or Firm* — Stephen L. Sheldon

(57) ABSTRACT

A card connector essentially includes an insulation body, a metal shell and an ejection lever. The insulation body includes a pair of two guide arms formed at two sides of the insulation body, a plurality of conductive terminals and an ejection apparatus formed at one of the two guide arms. The metal shell is engaged with the insulation body for receiving a card. The ejection lever is pivotally attached to an inner surface of the metal shell thereby forming a pivot mechanism, and operatively connected to the ejection apparatus such that the ejection lever rotates around the pivot mechanism when the ejection apparatus is actuated. The metal shell includes an integrally formed bulge protruding from the metal shell, and the bulge is formed in the vicinity of the pivot mechanism so as to reinforce the strength and rigidity of the metal shell.

9 Claims, 7 Drawing Sheets

CARD CONNECTOR WITH BULGE PORTION

RELATED APPLICATIONS

This application claims priority to Singapore Patent Application No. 200807744-8, filed Oct. 16, 2008.

BACKGROUND OF THE INVENTION

The present invention generally relates to the art of electrical connectors and, more particularly, to a card connector.

DESCRIPTION OF THE RELATED ART

Known card connectors with ejection mechanisms typically comprise a metal shell, an ejection rod and an ejection lever, as disclosed in U.S. Pat. No. 6,234,813. The metal shell is attached to the connector body and covers at least a part of a Compact Flash ("CF") card or other type of memory card inserted in the card connector. The connector body has a guide section at one side thereof, and the ejection rod is attached, in a manner permitting a sliding motion, within the guide section. The ejection lever is attached, in a manner permitting rotation, to the metal shell through a pivot mechanism, and is operatively connected to the ejection rod such that the ejection lever is rotated when the ejection rod is pushed. The ejection lever has a card-engagement projection formed on one end to contact one side of the card, permitting ejection of the card from the card connector by rotation of the ejection lever.

Because the metal shell may have an opening for forming the pivot mechanism, the strength of such area of the metal shell is relatively weak. Therefore, two potential problems with the above-mentioned card connectors may occur: (1) The metal shield may be pressed down with an unintentionally large force, causing electrical shorting of the conductive terminals of the card connector; and (2) part of the force applied to the ejection lever could be transmitted to the pivot mechanism of the metal shield, causing an upward deflection of the metal shield. As the connector is cycled, the exerted forces could potentially cause the metal shield to become less tightly attached to the card connector housing body. This looseness could cause an undesired component force to be applied to the metal shell; and the force could cause damage to or deformation of the metal shell and likely increase the force required to eject a card.

SUMMARY OF THE INVENTION

In an embodiment, a card connector includes an insulation body, a metal shell and an ejection lever. The insulation body includes a pair of guide arms formed at two sides of the insulation body and a plurality of conductive terminals and an ejection apparatus formed at one of the two guide arms. The metal shell is shaped to combine with the insulation body so as to provide for receiving a card. The ejection lever is pivotally attached to an inner surface of the metal shell and operatively connected to the ejection apparatus such that the ejection lever is rotated around the pivot mechanism when the ejection apparatus is actuated. The metal shell includes an integrally formed bulge protruding from the metal shell, and the bulge is formed in the vicinity of the pivot mechanism so as to reinforce the strength and rigidity of the metal shell. The bulge may be stamped and protruding from an upper surface of the metal shell. The bulge may include a curved portion surrounding the pivot mechanism and two lateral portions connecting to and extending from two ends of the curved portion. The curved portion may be formed like a dish, and the opening of the dish faces the pivot mechanism.

DETAILED DESCRIPTION OF THE INVENTION

Embodiments of the present invention will now be described with reference to the accompanying drawings. It has been determined that a card connector with a metal shell may be subject to inadvertent pressure or deformation due to an undesired upward force caused by the actuation of an ejection lever of the card connector. Certain aspect of the present disclosure illustrate feature that can be used to provide a card connector with a reinforced metal shell that can help to avoid this problem.

Figure 1:
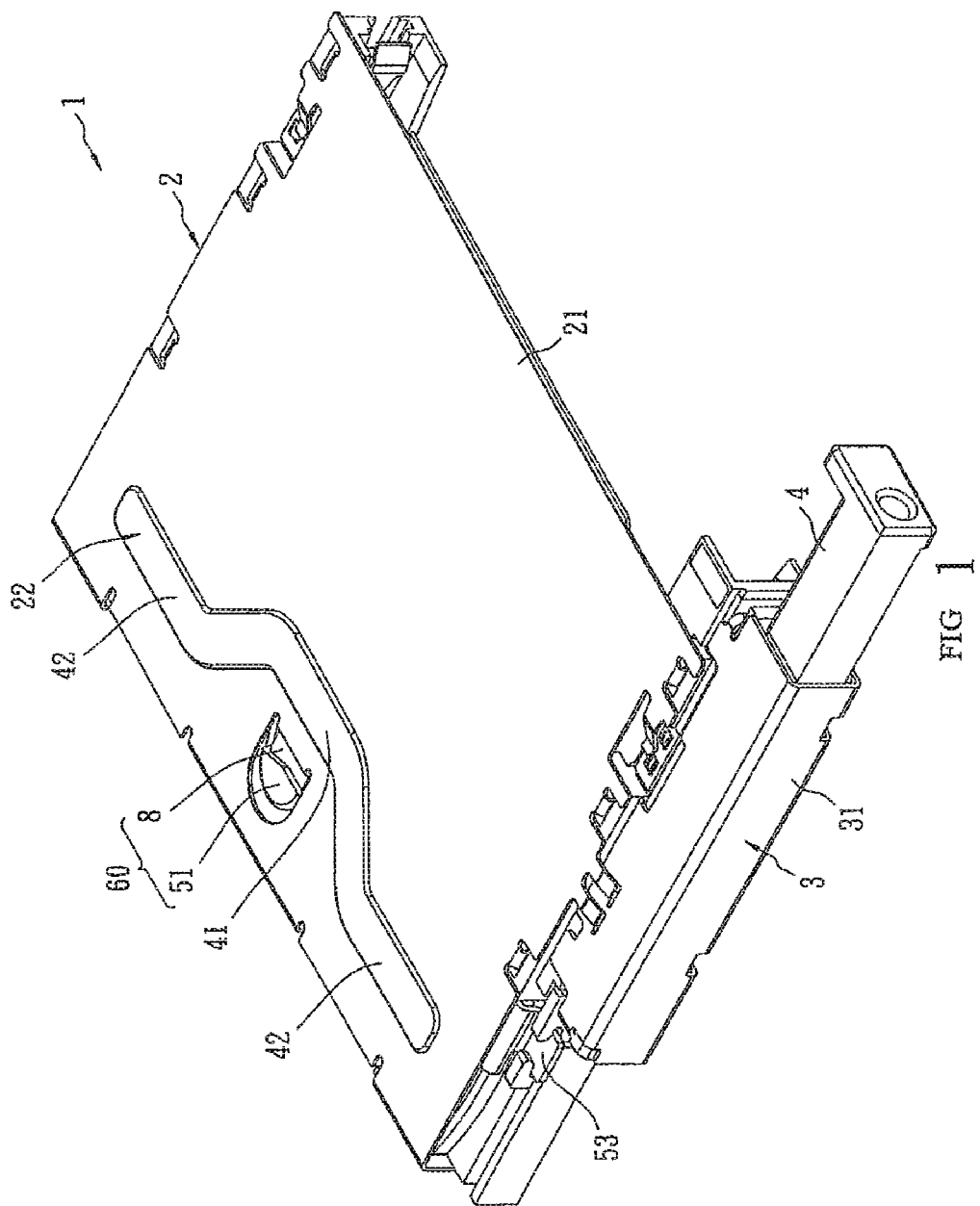
FIG. 1 illustrates a perspective view of an embodiment of a card connector.
Figure 2:
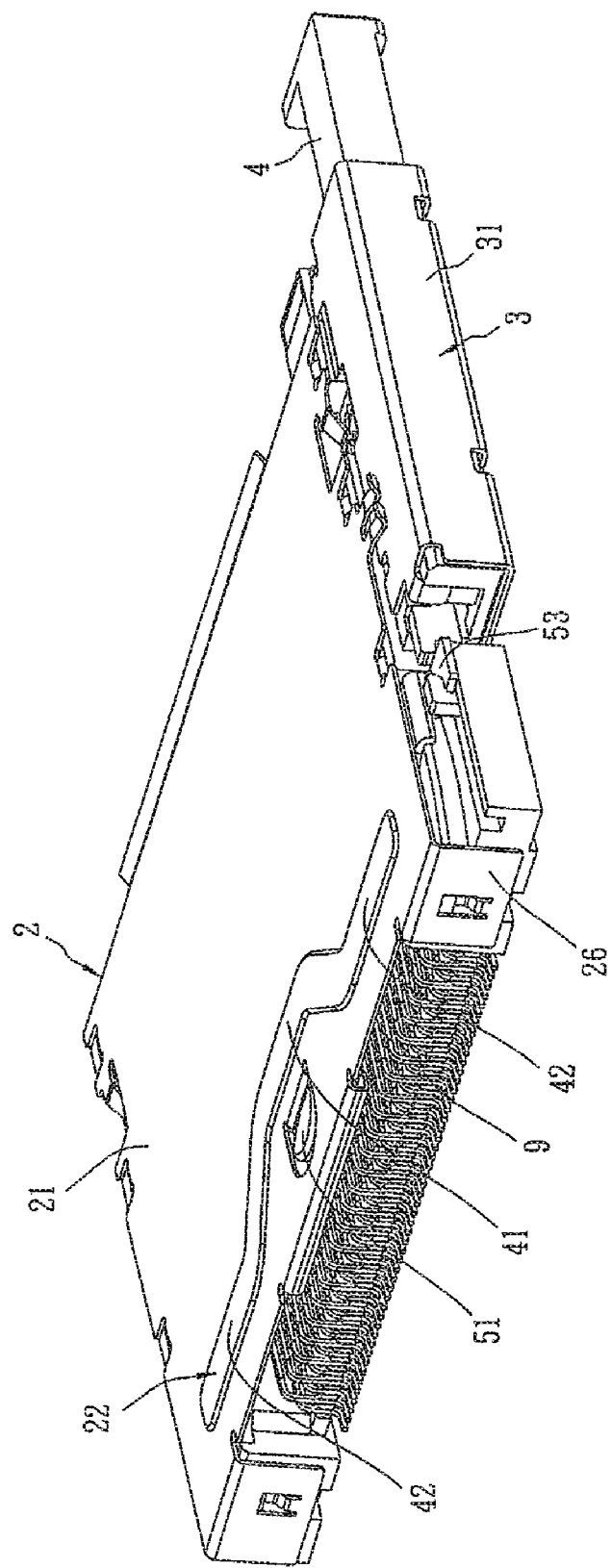
FIG. 2 illustrates another perspective view of the card connector depicted in FIG. 1.
Figure 3:
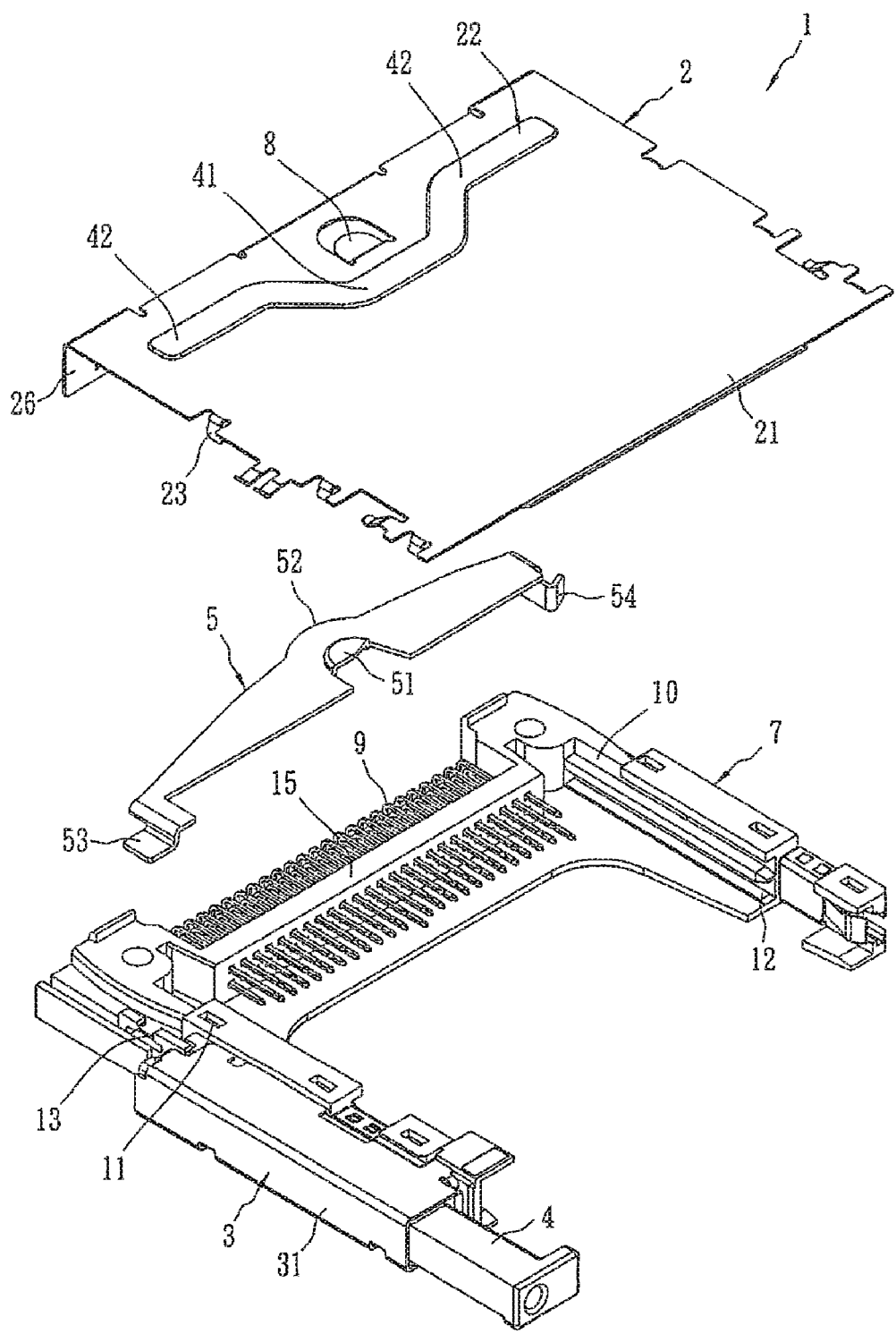
FIG. 3 illustrates an exploded perspective view of the card connector depicted in FIG. 1.

FIGS. 1 and 2 show a card connector 1 in accordance with an embodiment of the present invention from different view angles, and FIG. 3 shows the card connector 1 in an exploded form. As seen in FIGS. 1 through 3, the card connector 1 comprises a metal shell 2, an ejection lever 5 and an insulation body 7. The insulation body 7 has a pair of parallel guide arms 10 each defining a guiding slot 12 for guiding an electrical card (not shown) into the card connector 1. One of the guide arms 10 is provided with an ejection apparatus 3, and an ejection rod 4 is slidably movable within a housing 31 of the ejection apparatus 3. In other words, the housing 31 encloses the ejection rod 4. A plurality of conductive terminals 9 are placed on a crossbar 15 connecting the two guide arms 10. In this embodiment, the ejection rod 4 is a rectangular piece, and includes an L-shaped end that is used for being pushed by a user. The ejection apparatus 3 is of a push-push type.

The two parallel guide arms 10 of the insulation body 7 include slots 11 for being engaged with joint pieces 23 of the metal shell 2 and the guiding slots 12 for receiving an electronic card, such as a CF card (not shown). The ejection rod 4 has a connecting end including a recess 13 engaged with a tab portion 53 formed at one end of the ejection lever 5, and a hook-shaped ejecting end 54 is formed at an opposite end of the ejection lever 5, thereby permitting ejection of a card from the card connector 1 by rotation of the ejection lever 5.

Figure 4:
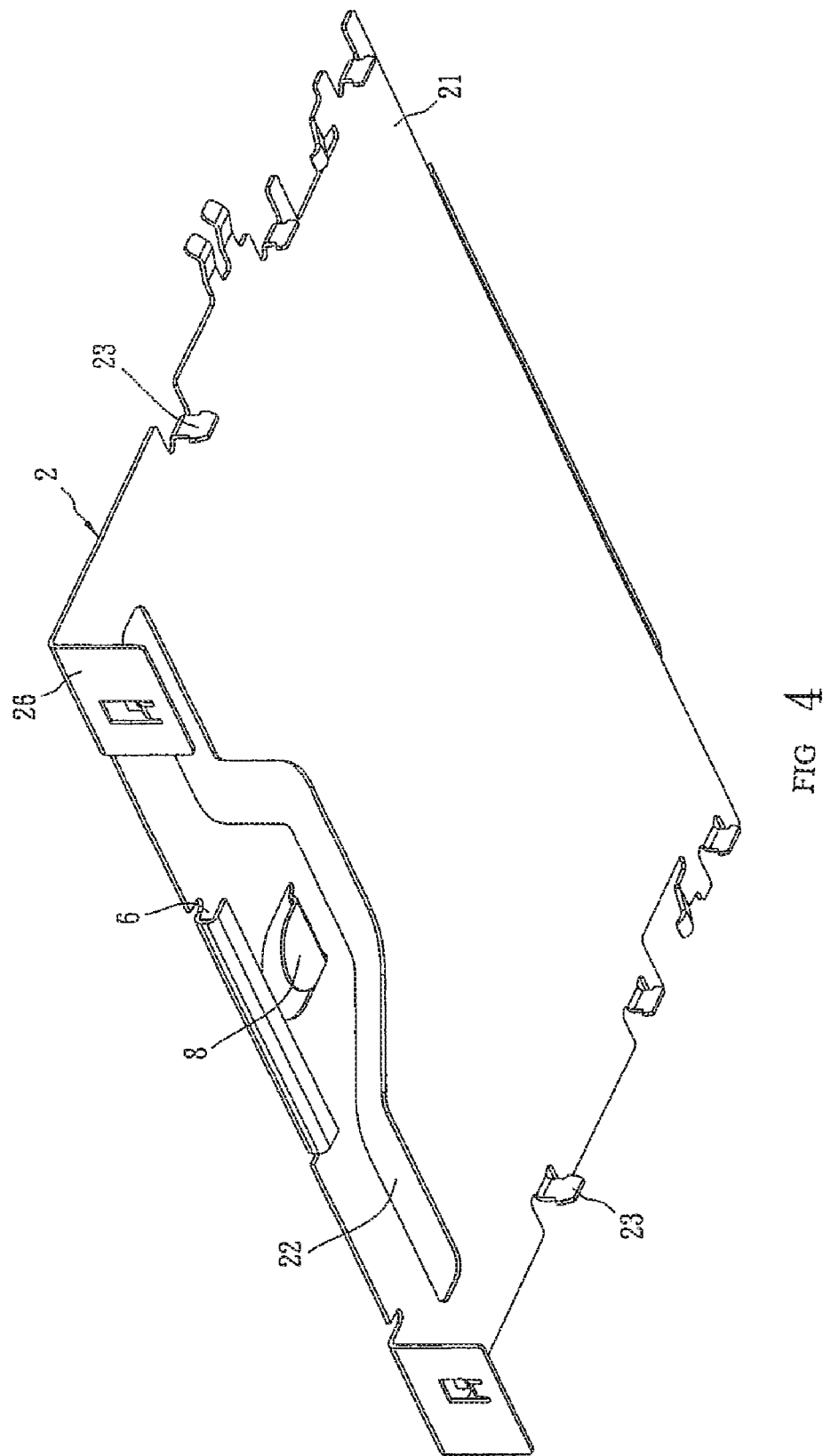
FIG. 4 shows a three-dimensional bottom view of the metal shell of the card connector in accordance with the present invention.
Figure 5:
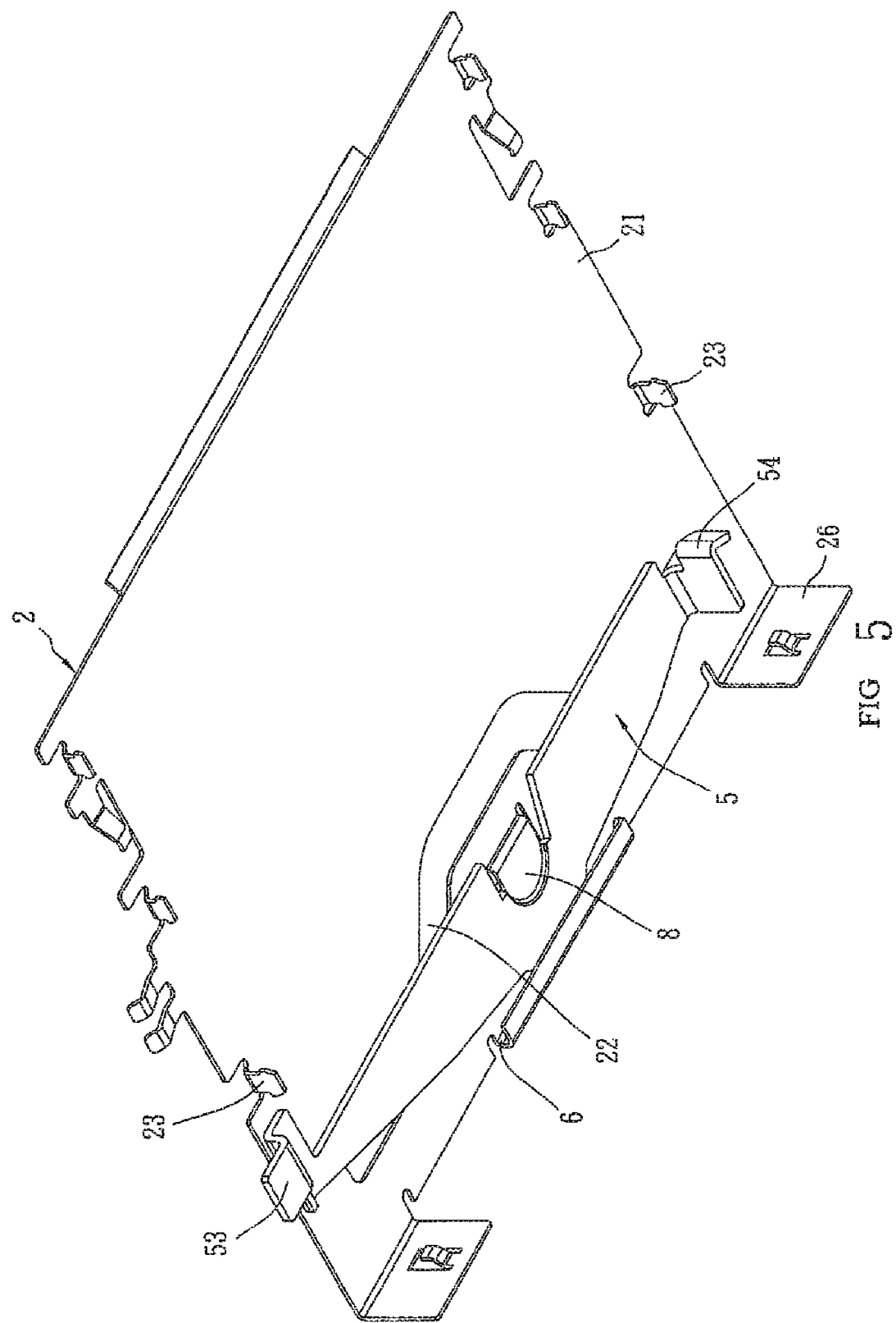
FIG. 5 shows a three-dimensional bottom view of the metal shell engaging an ejection lever of the card connector in accordance with the present invention.

As shown in FIGS. 4 and 5, showing three-dimensional bottom views of the metal shell and the metal shell engaging with an ejection lever, respectively, the main portion 21 of the metal shell 2 has a rear slot 6 formed on its back by bending a section inward, thereby permitting the ejection lever 5 to be partly received therein. A pivot projection 8 is stamped out of a center portion near the back of the main portion 21, thereby permitting the ejection lever 5 to be pivotally attached to the inner surface of main portion 21. The ejection lever 5 can be rotated on the inner surface of the main portion 21 by permitting a center edge part 51 (see FIG. 3) of the ejection lever 5 to engage the pivot projection 8 and by permitting the opposite edge part 52 (see FIG. 3) of the ejection lever 5 to be received in the rear slot 6. The ejection lever 5 is attached, in a manner permitting rotation, to an inner surface of the metal shell 2, and operatively connected to the ejection rod 4 through the engagement of the tab portion 53 and the recess 13 such that the ejection lever 5 is rotated in response to actuation of the ejection rod 4. Two rear tabs 26 are formed on the two sides of the rear of the main portion 21 by bending the main portion 21 and are engaged with the insulation body 7.

As mentioned above, the ejection lever 5 includes a center edge part 51, which is a bulge portion of this embodiment, formed on one center edge of the ejection lever 5 for engaging a pivot projection 8 on the main portion 21 of metal shell 2, and as such the center edge part 51 and the pivot projection 8 form a pivot mechanism 60. The ejection lever 5 may be stamped from a metal sheet. The ejection level 5 turns about the pivot projection and bulge portion by engaging the pivot projection 8 with the bulge portion 51 and by putting the opposite edge part 52 of the ejection lever 5 in the rear slot 6 of the metal shell 2.

Figure 6:
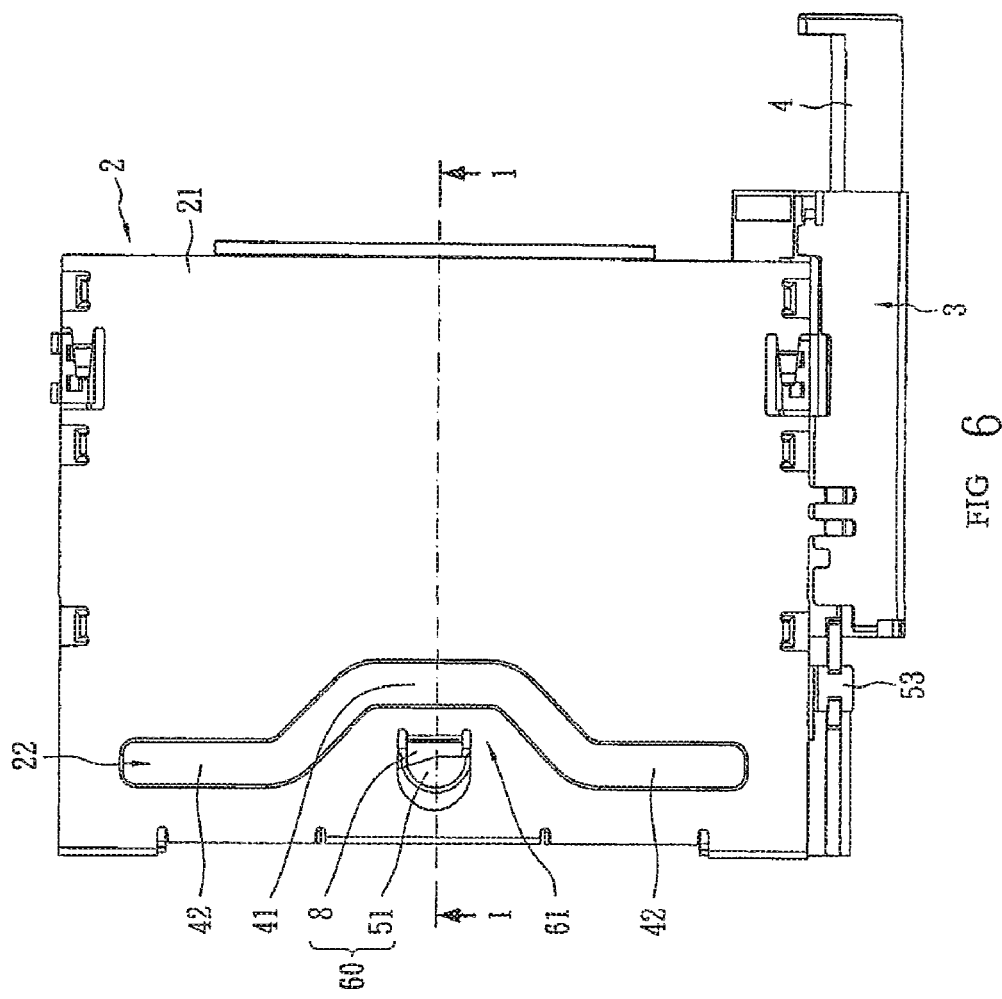
FIG. 6 shows a top view of the card connector in accordance with the present invention.
Figure 7:
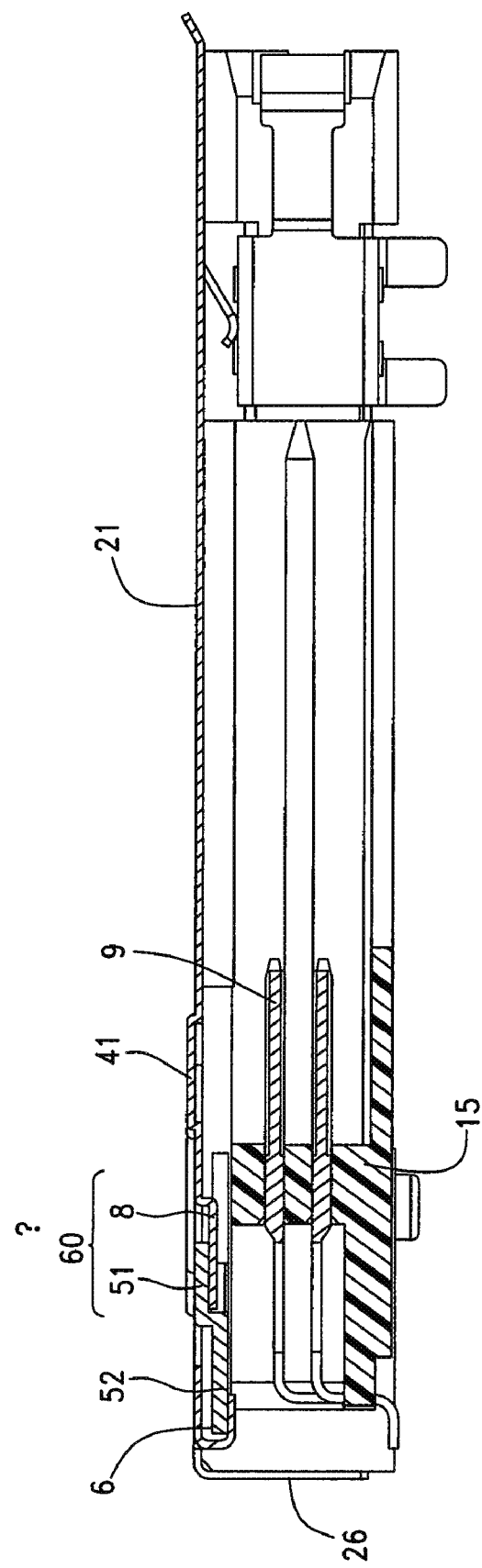
FIG. 7 is the cross-sectional view along line 1-1 of FIG. 6.

FIG. 6 shows a top view of the card connector 1, and FIG. 7 shows a cross-sectional view of line 1-1 shown in FIG. 6. As shown in FIG. 7, the pivot projection 8 is pivotally attached to the center edge part 51 thereby forming the pivot mechanism 60, and the opposite edge part 52 of the ejection lever 5 is received in the rear slot 6. The ejection lever 5 is thereby attached, in a manner permitting rotation, to an inner surface of the metal shell 2.

In an embodiment, a bulge 22 surrounding the pivot projection 8 and bulge portion 51, i.e., the pivot mechanism 60, is stamped out of the main portion 21 to reinforce the strength and rigidity of the metal shell 2. The bulge 22 is formed in the vicinity of the pivot mechanism 60 and protrudes from an upper surface of the metal shell 2. According to the top view of FIG. 6, the bulge 22 includes a curved portion 41 surrounding the pivot mechanism 60 and two lateral portions 42 connecting to and extending from two ends of the curved portion 41. In an embodiment, the curved portion 41 is dish-shaped, and has an opening 61 facing the pivot mechanism 60. The bulge 22 can be formed by stamping at a time to integrally form the curved portion 41 and the two lateral portions 42. Accordingly, the main portion 21 of the metal shell 2 around the pivot mechanism 60 is reinforced by the bulge 21, thereby increasing the rigidity of the metal shell 2, and as a result the shorting problem and the upward deflection problem of the related art can be effectively avoided.

FIGS. 1 through 7 are illustrated for an embodiment only; other reinforced structures of alternative shapes that provide equivalent efficacy are also covered by the scope of the present invention.

The above-described embodiments of the present invention are intended to be illustrative only. Numerous alternative embodiments may be devised by those skilled in the art without departing from the scope of the following claims.

What is claimed is:

1. A card connector, comprising:
   an insulation body with two sides;
   a pair of guide arms formed at two sides of the insulation body;
   a plurality of conductive terminals supported by the insulation body;
   an ejection apparatus formed at one of the two guide arms;
   a metal shell engaging the insulation body for receiving a card, the metal shell including an inner surface and a pivot mechanism; and
   an ejection lever pivotally attached to the inner surface of the metal shell and operatively connected to the ejection apparatus such that the ejection lever rotates around the pivot mechanism when the ejection apparatus is actuated, wherein the metal shell comprises an integrally formed bulge protruding from the metal shell, wherein the bulge comprises a curved portion surrounding the pivot mechanism and two lateral portions connecting to and extending from two ends of the curved portion.

2. The card connector of claim 1, wherein the bulge protrudes from an upper surface of the metal shell.

3. The card connector of claim 1, wherein the bulge laterally extends from the pivot mechanism to two sides of the metal shell.

4. The card connector of claim 1, wherein the curved portion is dish-shaped.

5. The card connector of claim 4, wherein the curved portion has an opening formed by the dish-shape and the opening is facing the pivot mechanism.

6. The card connector of claim 1, wherein the bulge is stamped from the metal shell.

7. The card connector of claim 1, wherein the ejection apparatus comprises an ejection rod engaging the ejection lever.

8. The card connector of claim 7, wherein the ejection lever comprises a tab portion at one end, the ejection rod comprises a recess at one end, and the tab portion is engaged with the recess.

9. The card connector of claim 1, wherein the ejection apparatus further comprises a housing enclosing the ejection rod.

* * * * *